June 28, 1949.  H. J. DE N. McCOLLUM  2,474,685
JET PROPULSION APPARATUS
Filed April 12, 1945  4 Sheets-Sheet 1
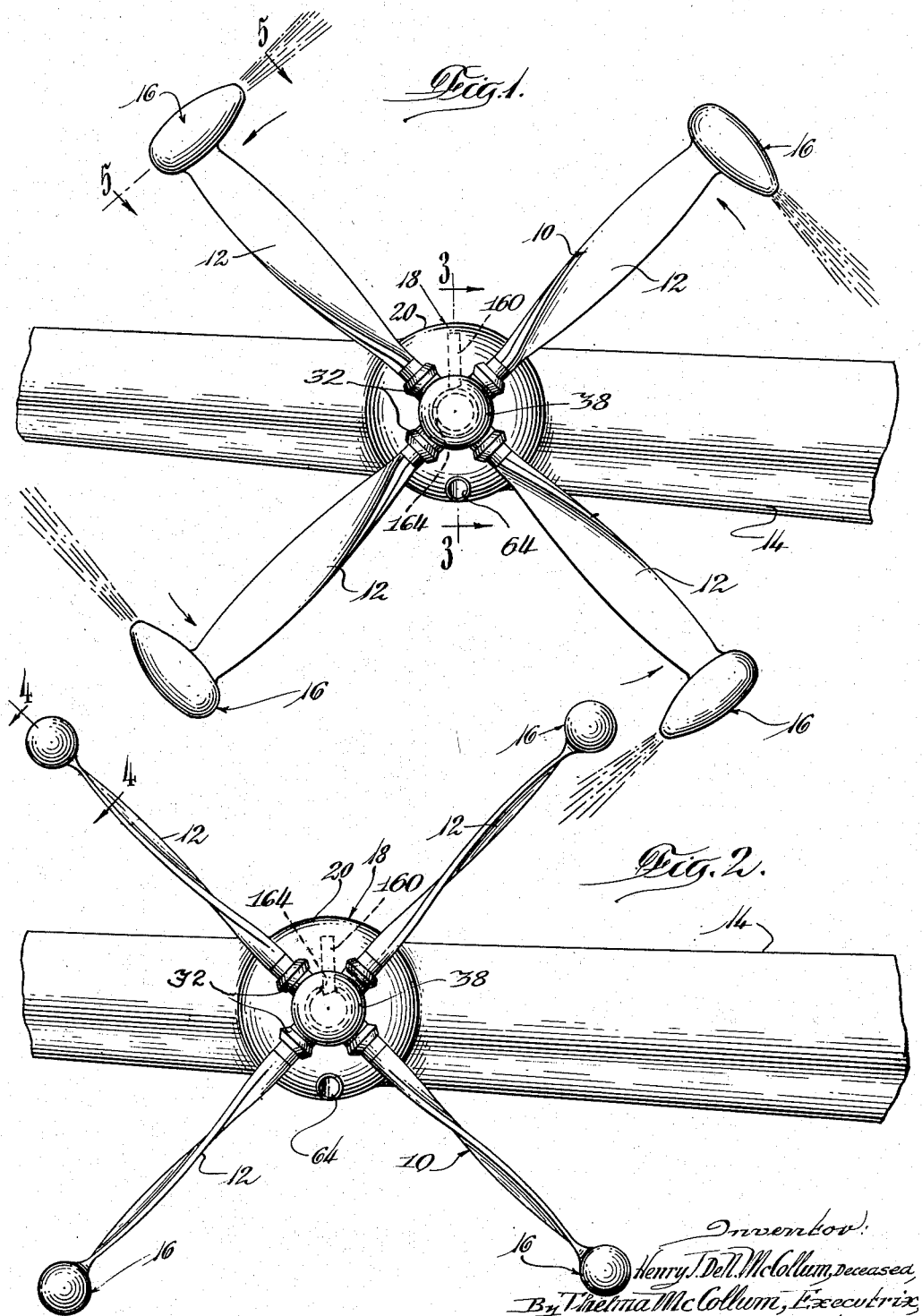

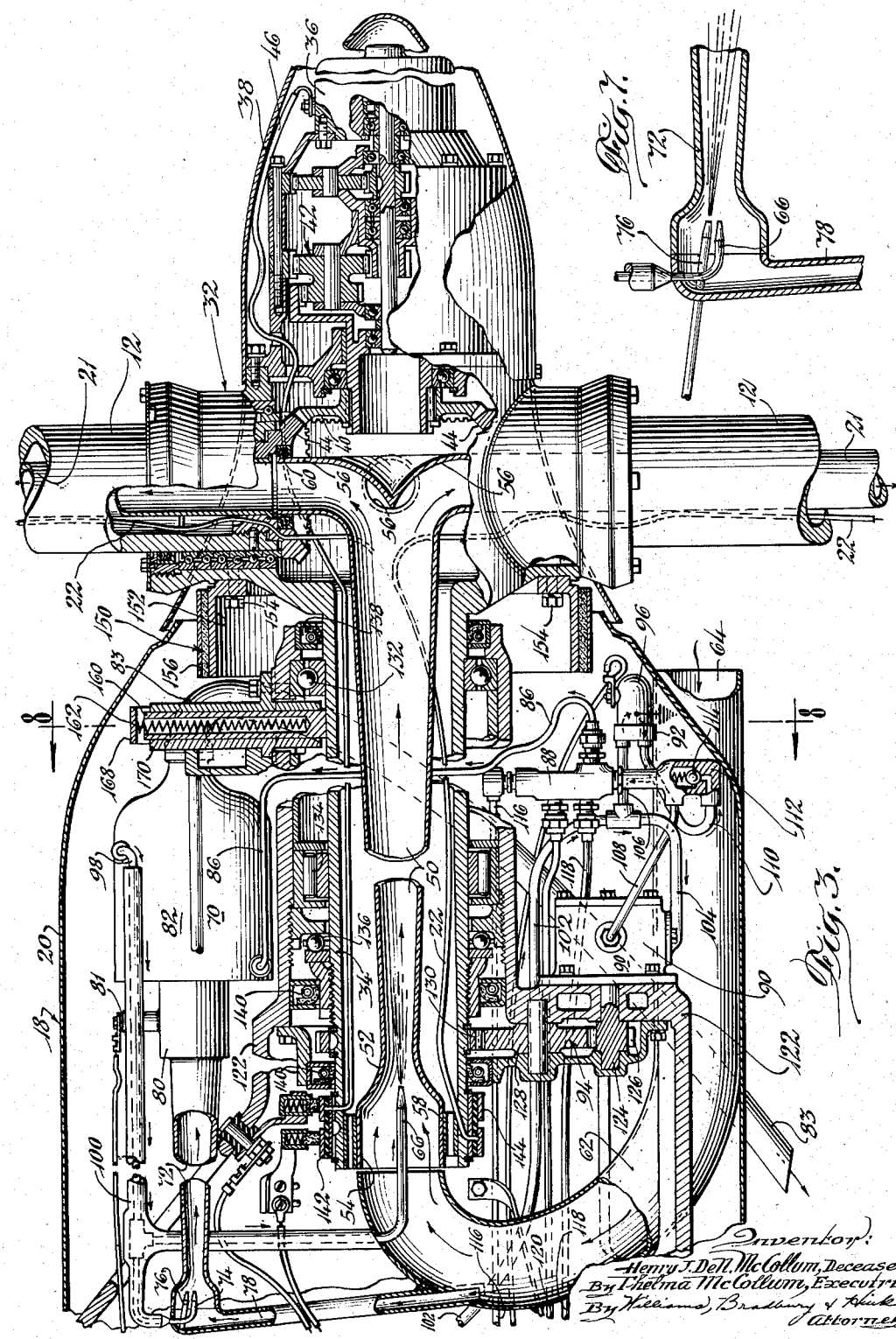

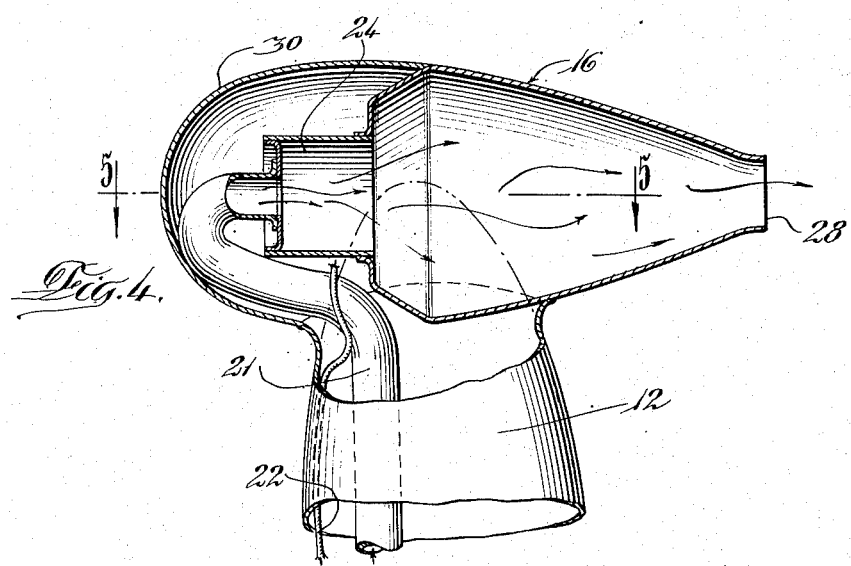
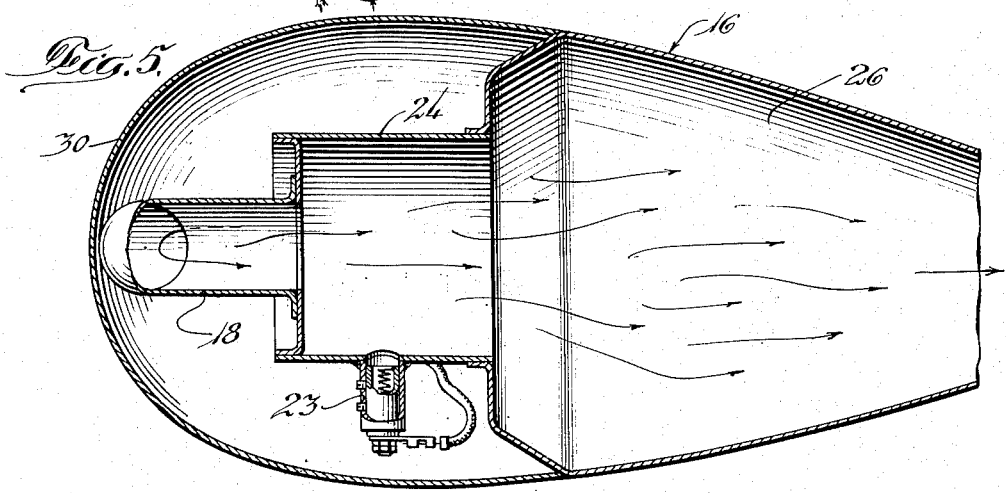
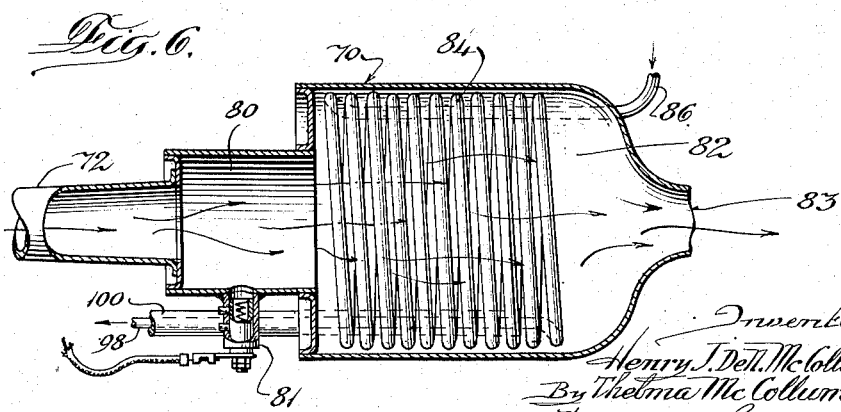

June 28, 1949.   H. J. DE N. McCOLLUM   2,474,685
JET PROPULSION APPARATUS
Filed April 12, 1945                                4 Sheets-Sheet 4
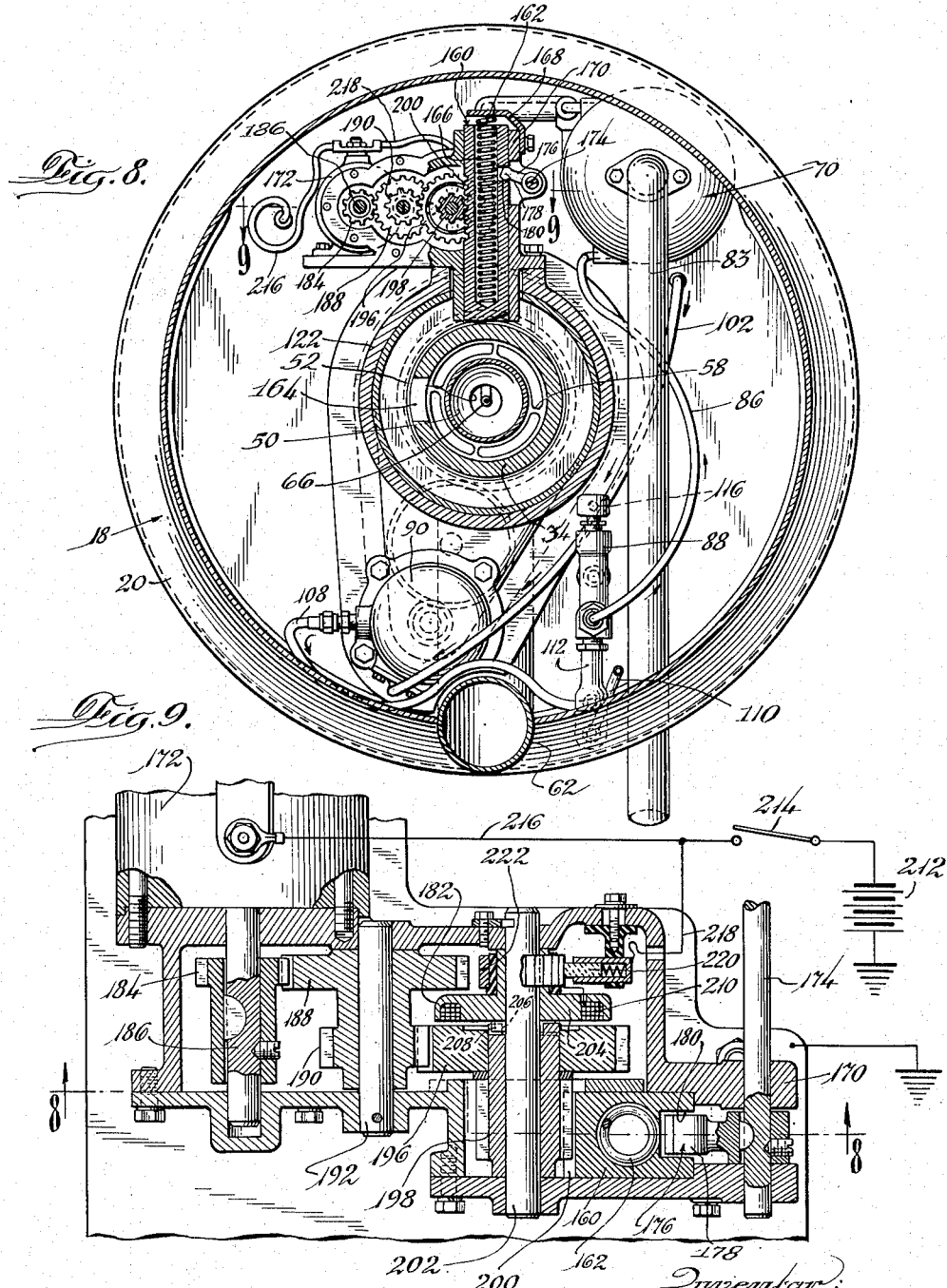

Patented June 28, 1949

2,474,685

UNITED STATES PATENT OFFICE 2,474,685

JET PROPULSION APPARATUS

Henry J. De N. McCollum, deceased, late of Chicago, Ill., by Thelma McCollum, executrix, Chicago, Ill., assignor to Stewart-Warner Corporation, Chicago, Ill., a corporation of Virginia Application April 12, 1945, Serial No. 587,929

1 Claim. (Cl. 170—135.4)

The present invention pertains to jet propulsion apparatus and has for its primary object the provision of a new and improved aircraft wherein jet propulsion apparatus is utilized in different ways to propel the craft at lower and higher speeds.

Another object of the present invention is to provide a new and improved jet propelled aircraft wherein jet propulsion means is operable selectively to drive a propeller or to drive the craft directly.

Another object of the present invention is the provision of a new and improved propeller driven aircraft wherein jet propulsion apparatus is utilized in different ways at different speeds of the aircraft.

Another and more specific object of the present invention is the provision of new and improved propeller driven aircraft wherein jet propulsion apparatus is utilized to rotate the propeller at lower forward speeds and wherein the same jet propulsion apparatus is utilized directly to drive the airplane at higher altitudes and higher speeds.

A further and more specific object of the present invention is to provide a new and improved aircraft of the character specified in the preceding paragraph wherein means are provided to facilitate changeover from one type of drive to the other and to insure that the propeller stops in a predetermined position when the aircraft is driven directly by the jet propulsion means, thereby to preclude damage of the airplane by the escaping jets.

Other objects and advantages of the present invention will become apparent from the ensuing description in the course of which reference is had to the accompanying drawings in which:

Fig. 1 is a fragmentary elevational view of an aircraft constructed in accordance with the present invention conditioned for drive of the aircraft by a propeller driven by jet propulsion means;

Fig. 2 is a similar view with the apparatus conditioned for direct driving of the aircraft by the jet propulsion means;

Fig. 3 is a vertical longitudinal central cross-sectional view, taken along the line 3—3 of Fig. 1, ilustrating the jet propulsion propeller mounting assembly including variable pitch gearing and means for supplying a combustible mixture to jet propulsion units, which are located at the propeller blade tips;

Fig. 4 is an enlarged cross-sectional view taken along the line 4—4 of Fig. 2 illustrating details of construction of one of the jet producing means mounted at the tip of a propeller blade;

Fig. 5 is an enlarged cross-sectional view taken along the line 5—5 of Fig. 4 (and also along the line 5—5 of Fig. 1);

Fig. 6 is a vertical axial cross-sectional view taken through a fuel vaporizer forming part of the apparatus and ilustrated in elevation Fig. 3;

Fig. 7 is an enlarged fragmentary cross-sectional view of means for providing the combustible mixture to the fuel vaporizer illustrated in Fig. 6;

Fig. 8 is a cross-sectional view along the line 8—8 of Figs. 3 and 9 illustrating details of construction of the novel means for properly locating the propeller blades when the apparatus is conditioned for direct driving of the aircraft by the jet propulsion units, and Fig. 9 is an enlarged fragmentary cross-sectional view taken along the line 9—9 of Fig. 8.

The present invention provides a novel means for increasing the operating efficiency of jet propelled aircraft. It contemplates the driving of the airplane at low speeds at low and possibly medium altitudes by a propeller which is rotated by jet propulsion units mounted at the tips of the propeller blades, thereby to take advantage of the higher speed of rotation of the blade tips. The invention further contemplates the driving of the aircraft at higher altitudes and higher speeds directly by the jet propulsion means. Accordingly, the jet propulsion units are constructed and arranged so that the jets may be made to point in different directions during the different modes of operation of the plane. When driving the propeller, the jets are located tangentially relative to the circle described by the propeller blade tips whereas they point rearwardly in the direct drive of the aircraft. This is best illustrated in Figs. 1 and 2 to which reference is now had.

The jet propulsion apparatus of the present invention may be applied to different types of aircraft. In the illustrated embodiment the aircraft has not been shown as a whole but it may include a plurality of variable pitch propellers 10 having blades 12. The propellers may be mounted upon portions of the aircraft such as the wings 14 of which but one has been illustrated. Jet producing means 16 of a type disclosed and claimed in the copending application Serial No. 584,362, filed March 23, 1945, are mounted at the tips of the propeller blades 12. They are supplied with a combustible mixture from a mixture supplying unit 18 mounted within a generally streamlined shell or housing or nacelle 20 suitably secured to the wing.

At low speeds of operation, the propeller is operated in conventional manner except that it is rotated by the jet producing units 16, which are then disposed as illustrated in Fig. 1, so that the jets are located substantially tangentially relative to the circle described by the propeller blade tips. At high speeds, the propeller blades are feathered so that the jets point to the rear of the aircraft, as well illustrated in Fig. 2, whereby the reaction of the jets directly drives the aircraft forward. Accordingly, the jet propulsion apparatus operates at high speeds and higher efficiency in both modes of drive.

It is contemplated that the jet producing means 16 may be provided with a combustible mixture in many of various ways. It is preferred, however, that they be supplied with combustible mixture with apparatus disclosed and claimed in the heretofore referred to copending application. This apparatus is best illustrated in Figs. 3 to 6, inclusive, to which reference is had now to an extent sufficient to enable those skilled in the art to have an adequate understanding of the apparatus and mode of operation of the present invention.

The propeller blades 12 are preferably hollow for the reception of conduits 21, through which the combustible mixture is supplied to the jet producing means, and electrical conductors 22 through which current is supplied to ignition means 23 (see Fig. 5) associated with the jet producing means. Each of the jet producing means includes an ignition chamber 24 to which the end of the conduit 18 is secured in suitable manner and opening into a combustion chamber 26 of generally conical configuration and having a relatively small nozzle defining opening 28 at its trailing end. Each of the units is given a generally streamlined configuration by the generally conical combustion chamber 26 and a rounded closure cap 30 surrounding the ignition chamber 24 and the outer end of the conduit 18. The blade, the combustion chamber, and the cap are suitably united, as by welding, to provide a unitary structure.

The propeller blades are secured to a propeller supporting structure, indicated generally by reference character 32, having a rearwardly extending tubular extension 34, whereby the propeller assembly is rotatably secured to the aircraft and for other purposes which will become apparent shortly.

The propellers are preferably of the variable pitch type so that their effectiveness may be controlled and particularly so that the propeller blades may be feathered into the position in which they are illustrated in Fig. 2 for direct drive by the jet propulsion apparatus.

The pitch of the blades is controlled by an electric motor 36 mounted within a housing 38 located centrally and forwardly of the propeller. The motor drives a bevel gear 40 through gearing indicated generally by reference character 42 and the gear 40, in turn, drives bevel gears 44 located at the inner ends of and secured to the propeller blades. It is not deemed necessary fully to describe this mechanism for the reason that it is a type well known to those skilled in the art, being a Curtiss electric propeller. It is believed sufficient to state that the motor may be controlled through wiring 46 selectively to vary the pitch.

The combustible mixture is supplied to the jet producing means by means including a mixing tube 50 having a Venturi throat 52 intermediate its ends, an air inlet 54, and a discharge end terminating in a number of branch discharge conduits 56 leading to the conduits 21 in the propeller blades 12. The mixing tube is secured within the interior of the previously referred to tubular extension 34. This may be done by various means, the means illustrated including a spider 58 adjacent the air inlet end and by stuffing boxes 60 surrounding the branch conduits. The latter not only serve to secure the mixing tubes in place but they permit relative rotation between the conduits 56 and 21 when the pitch of the propeller blades is varied.

The construction of the mixing tube as well as the means for providing the combustible mixture is, as already indicated, of the type disclosed and claimed in the above referred to copending application, which application, like the instant one, also includes means constructed and arranged according to the disclosure and claims of the copending applications Serial Nos. 587,926 and 587,927 both filed Apr. 12, 1945.

The combustible mixture is supplied by a high velocity jet of high temperature and high pressure vaporized fuel which entrains and aspirates sufficient air to produce a combustible mixture, all without the necessity of utilizing any mechanical compressor such as is now necessary in known types of jet propulsion apparatus. The air is supplied to the intake 54 of the mixing tube through a conduit 62 having a reverse bend in it and a forwardly opening port 64 at the leading edge of the aircraft as illustrated best in Figs. 2 and 3. Fuel is supplied during normal operation, as during flight, to the mixing tube through a stationary nozzle 66 at high temperature and high pressure, thereby to produce the high velocity jet entraining and aspirating air, which is at high pressure during normal flight of the aircraft.

Vaporized fuel is supplied to the mixing tube by means including a vaporizer 70 preferably located above the apparatus thus far described. The vaporizer has associated with it a mixing tube 72, similar to the mixing tube 50 heretofore referred to, to which fuel is supplied during normal operation through a nozzle 74 and to which fuel is supplied during starting from some auxiliary source of high volatility fuel (such as propane or butane) by a nozzle 76. Air is supplied to the mixing tube through a branch inlet conduit 78 leading to the main air inlet 62.

The discharge end of the mixing tube leads to an ignition chamber 80, having ignition means 81 associated therewith, opening into the combustion chamber 82 within which is mounted a tubular heat exchanger element 84 through which fuel flows and is vaporized. The products of combustion are exhausted from the combustion chamber through an exhaust conduit 83 leading to atmosphere.

Liquid fuel is supplied to the coil 84 of the vaporizer through a fuel supply line 86 under the control of a pressure control valve 88 and from either one of two pumps 90 and 92, the first of which is driven by the propeller through gearing indicated generally by reference character 94 and the second of which is driven by a selectively energizable electric motor 96. Vaporized fuel from the vaporizer is supplied to nozzles 66 and 74 through a conduit 98, which is preferably surrounded with heat insulating material 100, as illustrated in Fig. 3.

Fuel of suitable kind, such as gasoline, is supplied to the fuel pumps 90 and 92 through a fuel supply line 102 connected to a tank (not shown) and leading to the inlet sides of the pumps through branch conduits 104 and 106, respectively. The discharge sides of the pumps are connected to the inlet end of the pressure control valve 88 through conduits 108 and 110, respectively, and an inlet fitting 112 having a spring pressed ball check valve 114 therein to prevent back flow of fuel through the pump 92 when the main fuel pump 90 is in operation.

The pressure control valve 88 is constructed and arranged to deliver an adjustable predetermined amount of liquid fuel to the vaporizer as determined by the position of an adjustment rod 116. The excess of liquid fuel is returned to the storage tank through a return or by-pass line 118 while leakage liquid fuel is returned to the storage tank through a line 120. This valve is constructed as disclosed and claimed in the copending applications, referred to above, to which reference may be had for a more complete description.

The pump 90 is secured in suitable manner to main supporting structure 122. It is rotated by gearing interconnecting the pump shaft 124 and the previously referred to tubular extension 34. This gearing includes a gear 126 secured to the motor shaft, an intermediate gear 128 and a gear 130 fixedly secured to the outside of the tubular extension 34.

The tubular extension is journaled for rotation in the supporting structure 122 by a front roller ball bearing 132, an intermediate roller bearing 134, and a rear thrust ball bearing 136. Lubricant is prevented from leaking by front, intermediate, and rear rotary seals 138, 140 and 142, respectively.

Current is supplied to the previously referred to conductors 22 and 46 by slip rings 142 and 144 secured in insulated manner to the inner end of tubular extension 34.

When it is desired to change over from low speed propeller drive to high speed direct jet propulsion drive, the propeller blades are feathered so that the jets point to the rear of the plane as indicated in Fig. 2. The slowing down of the propeller blades is speeded by brake means, indicated generally by reference character 150, including a brake shoe 152 secured to the propeller supporting structure 32 in suitable manner as by a plurality of bolts 154 and a brake band 156 selectively operable, by means not shown, to brake the propeller or to release it for rotation.

According to another feature of the present invention the propeller is located in proper position relative to the remainder of the aircraft by selectively operable detent means. The detent means may take the form of a pawl 160 which is pressed by a spring 162 toward a recess 164 in the tubular extension 34 of the propeller supporting structure. In order to prevent the propeller from being locked by the spring pressed pawl, except when the propeller is brought substantially to a standstill, the pawl and recess are made with polygonal and approximately the same cross section.

The pawl biasing spring is preferably disposed within a central longitudinal opening 166 within the pawl and the outer end bears against a spring abutment bracket 168 suitably secured to a portion 170 of the stationary supporting structure.

The pawl is ordinarily retracted from the recess in order to condition the apparatus for propulsion by the propeller, by a suitable motor, preferably an electric motor 172, although, to provide for emergency operation it may be moved in opposite directions manually through an operating shaft 174. The shaft 174 is rotatably mounted in the supporting structure 170 and is operatively connected to the pawl 160 by a crank arm 176 having a rounded head 178 movably fitting within a recess 180 in one side of the pawl. Accordingly, the pawl may be moved up or down manually by simply rotating the operating shaft 174.

The motor 172 is normally declutched from the pawl but is adapted to be clutched to it whenever energized by a simultaneously energizable electromagnetic clutch 182 interposed in gearing interconnecting the motor and the pawl. The pawl, it will be remembered, is biased into clutching position by the spring 162 and the motor is thus adapted when energized to have the pawl toward its retracted position.

The motor 172 drives a pinion 184 mounted on the motor shaft 186. The pinion drives a pair of gears 188 and 190, preferably formed as a single unit and mounted upon a countershaft 192. The gear 190 drives a gear 196 rotatably mounted upon an extension of a pinion 198 meshing with rack gear teeth 200 extending lengthwise of the pawl. The assembly including pinions 196 and 198 is mounted for rotation upon a stationary shaft 202.

The electromagnetic clutch 182 is adapted, when energized, to interconnect the gears 196 and 198. The interconnection is effected by an electromagnetically movable clutch plate 204 mounted for axial movement along the shaft 202. The clutch plate has clutch teeth 206 normally engaging clutch teeth 208 on the pinion 198. The clutch plate also has a winding 210 preferably adapted to be energized simultaneously with the motor 172, whereby the clutch plate is moved downwardly to engage the side of the gear 196 effectively to connect this gear and gear 198.

The clutch winding 210 is adapted to be connected to a source of power, such as a battery 212 simultaneously with the motor upon closure of a switch 214. The motor circuit is completed through a conductor 216 and the clutch circuit is completed through a conductor 218, a brush 220, and a slip ring 222. When the switch is opened, both the motor and clutch winding are deenergized with the result that the clutch is released and the spring 162 is again effective to move the pawl 160 downwardly. The pawl does not enter the recess 164 in the propeller extension 34 until the propeller has substantially stopped.

In the following description of the operation of the apparatus of the present invention, it will be assumed that the propeller is stationary and with the locating pawl 160 out of its associated recess. This would be the case if the propeller stopped in the requisite position or if the pawl is retracted by the motor 172 or manually by rotation of the pawl operating shaft 174.

In order to start the propeller for low speed, low altitude flight, the fuel vaporizer is first brought to a high temperature using the auxiliary source of fuel, which may be propane or butane supplied to the vaporizer through nozzle 76. This can be readily accomplished by suitable fuel control means such as a valve which may be opened to supply the fuel to the vaporizer. At the same time the igniter 81 is supplied with current. The fuel injects air at relatively low pressure, the air flowing to the mixing tube 72 through the main and branch air inlet conduits 62 and 78. The combustible mixture is burned in the ignition and combustion chambers 80 and 82, respectively, until the vaporizer is hot.

After the vaporizer has been brought to a high temperature, the electric motor driven fuel pump 92 is placed into operation as by energizing the motor 96 through a suitable switch. The pump supplies fuel, such as gasoline, to the vaporizer through the pressure control valve 88 and conduit 86. The gasoline is vaporized in the coil 84 located within the combustion chamber and the pressure is gradually built up until the mixture supplied to the jet producing means 16 at the blade tips starts to burn and the propeller starts turning. Some of this fuel is also supplied to the vaporizer 70 through the nozzle 74.

The auxiliary fuel is shut off as soon as the vaporizer is hot enough to vaporize the gasoline in sufficient quantity to keep the system in operation. Once the propeller starts turning the auxiliary fuel pump can also be cut off because the main fuel pump 90, which is driven by the propeller, is effective to supply sufficient fuel to the vaporizer, also through the pressure control valve 88. Excess liquid fuel is returned to the storage tank.

In low speed, low altitude operation the propeller is rotated by the jet producing means 16, which are then so disposed that the jets are substantially tangential to the circle described by the blade tips. The propeller rotates at a relatively low speed but the jet producing means travels at high speed, with the consequent desirable high efficiency operation accompanying such high speed travel. The pitch of the blades can be varied as desired during flight with propeller drive by operating the pitch control motor 36.

When it is desired to drive the airplane directly by the jet propulsion means, the change-over can be effected either by simply feathering the blades or by cutting off the supply of combustible mixture and then feathering the blades. In either event, when the blades are feathered, the propeller is quickly stopped by the operation of the brake 150. When the propeller has been substantially stopped, the pawl 160 is forced into the recess 164 by the spring 162 whereby the blades are stopped in such position that the jet propulsion means are located clear of the airplane. Inasmuch as this change is not made until the airplane is travelling at higher speeds, it will be seen that the jet propulsion means also operates efficiently in the direct drive of the airplane. During this high speed operation, liquid fuel is supplied to the vaporizer by the electric motor driven pump 92.

To return to propeller drive, it is necessary only to retract the pawl 160 and to change the blade pitch. The latter is accomplished by the pitch control while the former is accomplished by closure of switch 214 to energize the pawl retracting motor 172 and the electromagnetic clutch 182. The motor then retracts the pawl through the gearing.

Should an emergency make it necessary to retract the pawl manually this can be done at any time by operation of the shaft 174.

Although the apparatus herein shown and described is designed to be operated primarily by liquid hydrocarbon fuel, it will be manifest that under some conditions gaseous fuels under pressure may be utilized. For aircraft propulsion the gaseous fuel can be compressed in a tank on the ground, and the tank can then be loaded onto the aircraft and connected to the fuel line of the apparatus, dispensing with the pump required to feed liquid fuel from its tank. Or instead of using propane or some other fuel of high vapor pressure merely as an auxiliary for starting purposes, it may be employed as the principal fuel; assuming that, upon its release from a confining tank, this fuel will not develop the pressure needed to compress the air aspirated in the mixing tube, the additional pressure required can be provided by the heat exchanger through which the fuel will pass upon its release from its tank. Similarly, a compressed gaseous fuel will be preheated and brought to a higher pressure by the heat exchanger before it is fed into the mixing tube.

While the present invention has been described in connection with the details of a single embodiment thereof, it should be understood that such details are not intended to be limitative of the invention except insofar as set forth in the accompanying claim.

Having thus described the invention, what is claimed as new and desired to be secured by Letters Patent is:

An aircraft power plant comprising a rotatable hollow propeller, a rotatable propeller shaft connected to the center of said propeller, said shaft being hollow and communicating with the hollow space in said propeller, means forming jet producing combustion chambers at the tips of said propeller communicating with the hollow space in said propeller and adapted to drive said propeller by reaction, means for forming a combustible mixture of fuel and air and for introducing said mixture under pressure into said hollow propeller shaft, means for igniting said mixture in said combustion chambers, mechanism associated with the central portion of said propeller for feathering the propeller blades and thereby pointing said reaction jets in a rearward direction, detent means associated with said hollow propeller shaft and adapted when actuated to locate and lock said shaft immovable with said jets operating clear of the aircraft structure.

THELMA McCOLLUM,
*Executrix of the Last Will and Testament of Henry J. De N. McCollum, deceased.*

REFERENCES CITED

The following references are of record in the file of this patent:

UNITED STATES PATENTS

| Number | Name | Date |
|---|---|---|
| 1,546,313 | Pescara | July 14, 1925 |
| 2,292,589 | Thomas | Aug. 11, 1942 |
| 2,356,746 | Boushey | Aug. 29, 1944 |
| 2,397,357 | Kundig | Mar. 26, 1946 |
| 2,438,151 | Davis | Mar. 23, 1948 |

FOREIGN PATENTS

| Number | Country | Date |
|---|---|---|
| 267,151 | Great Britain | Jan. 12, 1925 |
| 648,107 | France | Aug. 7, 1928 |
| 705,003 | France | Mar. 2, 1931 |

OTHER REFERENCES

Austronautics, No. 34, June 1936; ibid., No. 55, July 1943.